UNITED STATES PATENT OFFICE 2,227,968

DENATURED ALCOHOL CONTAINING 1:3 DIOXOLANE

Louis J. Figg, Jr., Kingsport, Tenn., assignor to Eastman Kodak Company, Rochester, N. Y., a corporation of New Jersey No Drawing. Application May 11, 1938,
Serial No. 207,354

2 Claims. (Cl. 252—366)

This invention relates to the denaturing of ethyl alcohol, and to alcohol so denatured.

It is an object of my invention to provide a denaturant which will render ethyl alcohol containing it unfit for use as a beverage, which cannot be economically removed from the alcohol so denatured, which will not render the alcohol unfit for industrial uses in which denatured alcohol has customarily been employed, and which will be free from methanol. Other objects will hereinafter appear.

I have discovered that a cyclic ether selected from the group consisting of 1:4-dioxane, 1:3-dioxane, 1:3-dioxolane and their substitution derivatives is an effective denaturant for alcohol. As examples of the substitution derivatives of 1:4-dioxane, 1:3-dioxane, and 1:3-dioxolane, I may mention the following:

2:2:5:5-tetrakis (chloromethyl)-1:4-dioxane

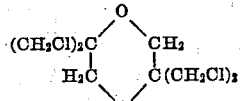

(C. A. 23, 4927 (1929); Ber. 1582—90 (1929)).

2:3-diethoxy-1:4-dioxane

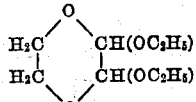

(C. A. 25, 4849 (1921)).

naphthadioxane

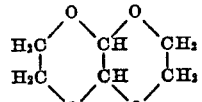

(C. A. 25, 4849 (1931)).

monochloro-1:4-dioxane

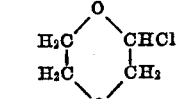

(C. A. 30, 1795 (1936)).

2:3-dimethyl-1:4-dioxane

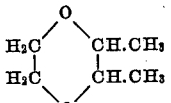

(C. A. 30, 1795 (1936)).

monophenyl-1:4-dioxane

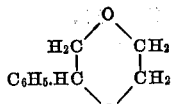

(C. A. 30, 1795 (1936)).

2:4-bis (bromomethyl)-1:3-dioxolane

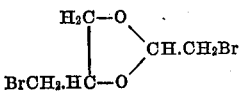

(C. A. 17, 1434 (1923)).

2-chloro-1:3-dioxolane

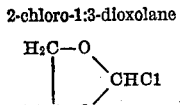

(J. Chem. Soc., 1598 (1933)).

2:2-dimethyl-4-methylene-1:3-dioxolane

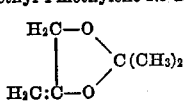

(C. A. 24, 5024 (1930)).

4-methyl-1:3-dioxolane

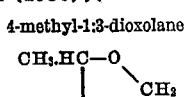

(C. A. 7, 594 (1913)).

2:2-dimethyl-4(5)-hydroxymethyl-1:3-dioxole

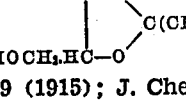

(C. A. 9, 1469 (1915); J. Chem. Soc. 107, 337 (1915)).

2-(dichloromethyl)-2-ethyl-5:5-dimethyl-1:3-dioxol-4(5)-one

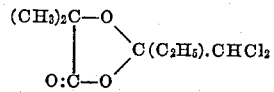

(C. A. 9, 787 (1915)).

2-methyl-1:3-dioxolane

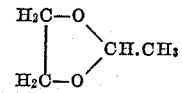

(C. A. 18, 1987 (1924)).

5-phenyl-4-methyl-1:3-dioxolane

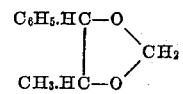

(C. A. 22, 406 (1928)).

2-hydroxyethyl-1:3-dioxane

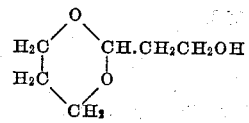

(C. A. 23, 4929 (1929)).

2:2-dimethyl-1:3-dioxane

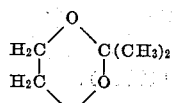

(C. A. 17, 1951 (1923)).

2-vanillin-5-hydroxy-1:3-dioxane

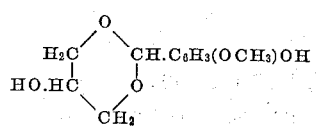

(C. A. 16, 2496 (1922); J. Am. Chem. Soc. 44, 1405 (1922)).

2:2-dimethyl-1:3-dioxan-5-ol

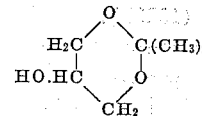

(C. A. 25, 916 (1931)).

2-(beta-chloroethyl)-1:3-dioxane

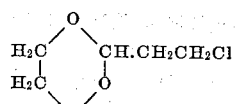

(C. A. 23, 4929 (1929)).

2-(gamma-acetoxypropyl)-4-methyl-1:3-dioxane

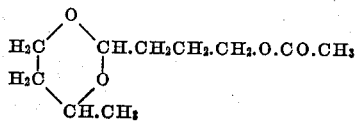

(C. A. 23, 4949 (1929)).

5-methoxy-1:3-dioxane

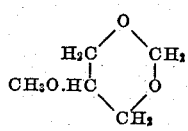

(C. A. 23, 99 (1929)).

2-methyl-2-ethyl-1:3-dioxan-5-ol

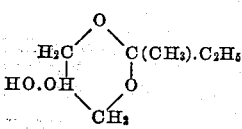

(C. A. 23, 4671 (1929)).

2-phenyl-1:3-dioxane

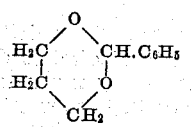

(C. A. 14, 1119 (1920)).

2-bromomethyl-1:3-dioxane

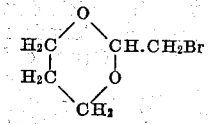

(C. A. 17, 1434 (1923); J. Am. Chem. Soc. 45, 747 (1923)).

In denaturing ethyl alcohol with my novel denaturants, I may use from 0.5 to 5 parts of the cyclic ether, or even more, per 100 parts of 95% alcohol. My novel denaturants may be used alone in denaturing, or they may be used in conjunction with denaturing materials derived from the destructive distillation of hardwood, such as those which are described in my U. S. Patents Nos. 1,975,090, 1,975,091 and 1,975,092. Likewise, they may be used in conjunction with amino compounds, or with any other denaturants with which they may be found to be compatible.

What I claim as my invention and desire to be secured by Letters Patent of the United States is:

1. Denatured ethyl alcohol containing, as an essential denaturing element, 1:3-dioxolane.

2. Denatured ethyl alcohol containing, per 100 parts of 95% ethyl alcohol, from 0.5 to 5 parts, approximately, of 1:3-dioxolane as an essential denaturing element.

LOUIS J. FIGG, Jr.

CERTIFICATE OF CORRECTION.

Patent No. 2,227,968.                 January 7, 1941.

LOUIS J. FIGG, JR.

It is hereby certified that error appears in the printed specification of the above numbered patent requiring correction as follows: Page 2, first column, line 14, for "5-phenyl-4-methyl-1:3-dioxolane" read --4-phenyl-5-methyl-1:3-dioxolane--; and that the said Letters Patent should be read with this correction therein that the same may conform to the record of the case in the Patent Office.

Signed and sealed this 1st day of April, A. D. 1941.

Henry Van Arsdale, (Seal)                               Acting Commissioner of Patents.